US010589307B2

(12) United States Patent
Colombaroli et al.

(10) Patent No.: US 10,589,307 B2
(45) Date of Patent: Mar. 17, 2020

(54) PLANTS FOR TREATING MOTOR-VEHICLE BODIES AND/OR MOTOR-VEHICLE COMPONENTS

(71) Applicant: GEICO S.p.A., Cinisello Balsamo (IT)

(72) Inventors: Paolo Colombaroli, Cinisello Balsamo (IT); Giampaolo Covizzi, Cinisello Balsamo (IT); Aldo Viola, Cinisello Balsamo (IT)

(73) Assignee: GEICO S.p.A., Cinisello Balsamo (IT)

( * ) Notice: Subject to any disclaimer, the term of this patent is extended or adjusted under 35 U.S.C. 154(b) by 0 days.

(21) Appl. No.: 15/329,681

(22) PCT Filed: Jul. 28, 2015

(86) PCT No.: PCT/IB2015/055682
§ 371 (c)(1),
(2) Date: Jan. 27, 2017

(87) PCT Pub. No.: WO2016/016798
PCT Pub. Date: Feb. 4, 2016

(65) Prior Publication Data
US 2017/0216869 A1    Aug. 3, 2017

(30) Foreign Application Priority Data
Jul. 31, 2014 (IT) .............................. MI2014A1394

(51) Int. Cl.
*B05B 13/04*    (2006.01)
*B05B 16/20*    (2018.01)
(Continued)

(52) U.S. Cl.
CPC ...... *B05B 13/0452* (2013.01); *B05B 13/0242* (2013.01); *B05B 13/0442* (2013.01);
(Continued)

(58) Field of Classification Search
CPC ....... B05C 15/00; B05C 13/02; B05C 5/0216; B05C 5/022; B05C 5/0208;
(Continued)

(56) References Cited

U.S. PATENT DOCUMENTS 5,674,570 A    10/1997   Fouvet
6,425,477 B1 *  7/2002   Karasawa ......... H01L 21/67715
                                                     198/465.2
(Continued)

FOREIGN PATENT DOCUMENTS

DE    3430531 A1    2/1986
WO    89/08181 A1    7/1989

OTHER PUBLICATIONS

Jing Wang and Gerardo Beni, "Cellular Robotic System with Stationary Robots and its Application to Manufacturing Lattices", IEEE 1989 pp. 132-137. (Year: 1989).*
(Continued)

*Primary Examiner* — Laura Edwards
(74) *Attorney, Agent, or Firm* — MH2 Technology Law Group LLP

(57) ABSTRACT

A station for treating objects may include: a booth including at least one entrance for an object and at least one exit for the object; a system configured to move the object between the at least one entrance and the at least one exit; at least one robot configured to treat the object in the booth; and/or a platform configured to support the object. The platform may be configured to rotate about a vertical axis so as to rotate the object inside the booth relative to the at least one robot. The at least one entrance may not be aligned with the at least one exit. The system may be configured to rotate with the platform so as to align with the at least one entrance in order to receive the object, and so as to align with the at least one exit in order to release the object.

20 Claims, 2 Drawing Sheets

(51) Int. Cl.
  *B05B 16/00* (2018.01)
  *B05B 16/40* (2018.01)
  *B05C 15/00* (2006.01)
  *B05C 13/02* (2006.01)
  *B05C 5/02* (2006.01)
  *B05B 13/02* (2006.01)
  *B65G 47/04* (2006.01)

(52) U.S. Cl.
  CPC .............. *B05B 16/20* (2018.02); *B05B 16/40* (2018.02); *B05B 16/95* (2018.02); *B05C 5/0216* (2013.01); *B05C 13/02* (2013.01); *B05C 15/00* (2013.01); *B65G 47/04* (2013.01); *Y10T 29/5124* (2015.01); *Y10T 29/5196* (2015.01)

(58) Field of Classification Search
  CPC ............ B05B 13/0452; B05B 13/0242; B05B 13/0442; B05B 15/1292; B05B 15/1207; B05B 15/1214; B05B 16/20; B05B 16/95; B05B 16/40; B05B 16/00; B05B 13/04; B05B 13/0431; B65G 47/02; B65G 47/04; B65G 17/00; B65G 47/905; B65G 47/902; Y10T 29/5124; Y10T 29/5196; B23Q 41/00–08; B23Q 7/14–1494; B23Q 11/08–0891; B23P 21/004; B23P 23/06; B23P 2700/50

USPC ........... 118/323, 326, 500; 198/346.1, 346.2, 198/469.1, 376, 377.06; 29/563, 33 P
  See application file for complete search history.

(56) References Cited

U.S. PATENT DOCUMENTS

| | | | |
|---|---|---|---|
| 6,557,694 B2 * | 5/2003 | Hansen | B62D 65/18 198/465.1 |
| 6,797,066 B2 * | 9/2004 | Yoshino | B05B 5/082 118/308 |
| 7,476,275 B2 * | 1/2009 | Ito | B05B 13/0221 118/326 |
| 2002/0069822 A1 | 6/2002 | Dattilo | |
| 2005/0155548 A1 * | 7/2005 | Shutic | B05B 7/1404 118/326 |
| 2005/0198804 A1 * | 9/2005 | Koren | B23P 21/004 29/430 |
| 2009/0226610 A1 * | 9/2009 | Koenig | C23C 14/042 427/248.1 |

OTHER PUBLICATIONS

International Search Report and Written Opinion for PCT/IB2015/055682 dated Oct. 13, 2015.

* cited by examiner

PLANTS FOR TREATING MOTOR-VEHICLE BODIES AND/OR MOTOR-VEHICLE COMPONENTS

CROSS-REFERENCE TO RELATED APPLICATION(S)

This application is a national stage entry from International Application No. PCT/IB2015/055682, filed on Jul. 28, 2015, in the Receiving Office ("RO/IB") of the World Intellectual Property Organization ("WIPO"), published as International Publication No. WO 2016/016798 A1 on Feb. 4, 2016, and claims priority under 35 U.S.C. § 119 from Italian Patent Application No. MI 2014 A 001394, filed on Jul. 31, 2014, in the Italian Patent and Trademark Office, the entire contents of all of which are incorporated herein by reference.

DESCRIPTION

The present invention relates to stations and plants for treating the surfaces of objects, for example in particular in paint shops in the automotive sector and, in particular, for treating the surfaces of motor-vehicle bodies and/or components, passing through the booth for the application of different types of materials depending on the different application cycles for painting, sealing, cleaning, preparing the surfaces or quality control and more generally all those applications where this invention may be adapted inside what is internationally referred to as the "paint shop".

In the prior art automatic stations comprising a booth equipped with robots which carry out a processing cycle are known.

Usually, these stations, which are arranged in sequence longitudinally, form a surface-treatment plant passed through by a conveyor line.

In the known plants, an object, such as a vehicle body/part, enters into the booth and remains inside it for the entire treatment time, while the articulated robots are moved and displaced so as to cover the entire area of the part to be treated, it therefore being possible to carry out the required process which is performed with a suitable applicator or with a specific apparatus designed to allow the planned processing operation. Normally at least two robots are used for each booth, being arranged on the two sides of the part to be treated, so that each of them can operate on the side assigned to it. The robots generally have a relatively high reach so as to be able to access, on the assigned side, all the points of the object (including objects with relatively large dimensions such as a vehicle body), and are somewhat costly.

Booths have been proposed where there is a single robot arranged above the object so as to be able to reach independently all the points of the object, but this gives rise to various problems including the fact that, owing to the arrangement of the robot above the vertical axis of the object, dripping or deposition of dust or the like onto the object itself may occur, ruining the final appearance of the treatment (in particular the paintwork).

Another very pressing problem affecting spray-painting booths is the need to recover and treat the so-called over-spray, namely the quantity of paint which is atomized inside the booth and which does not reach the surface. This over-spray in fact remains suspended in the air of the booth and must therefore be propelled into the area underneath the booth for treatment. The quantity of air necessary for elimination of the paint fumes is therefore a significant parameter for the purposes of energy consumption.

A further problem of the known plants is that the sequential arrangement of the booths must be in a straight line, with the entrance and exit of each booth located on opposite sides of the booth. This prevents optimized and efficient use of the space available in the plant.

The general object of the present invention is to provide innovative booth stations for the treatment of surfaces of objects, which are able to operate easily also with a single robot over the entire surfaces of the object to be treated.

Moreover, a further object of the present invention is to provide painting stations with a reduced over-spray zone. This is made possible by moving the parts to be treated in various zones, instead of the robot.

Yet another object of the present invention is to provide plants which allow better optimization of the spaces occupied and greater flexibility.

In view of these objects, the idea which has occurred is to provide, according to the invention, a station for treating objects, in particular for spray-painting vehicle bodies, comprising a booth with at least one entrance and at least one exit for an object, a system for moving the object between entrance and exit and at least one robot for treating the object in the booth, characterized in that it comprises inside the booth a support for supporting the object which enters the booth, which support is motor-driven to rotate about a vertical axis so as to rotate sequentially in respect to the treatment robot the object present on the support.

According to an embodiment of the invention the idea which has occurred is also to provide a station for treating objects, comprising a booth with at least one entrance and at least one exit for an object, a system for moving the object between entrance and exit and at least one treatment robot in the booth, characterized in that it comprises inside the booth a support for supporting an object which enters the booth, which support is motor-driven to rotate about a vertical axis so as to direct sequentially towards the treatment robot different sides of the object present on the support.

Still according to the invention, the idea which has occurred is to provide plants formed by a plurality of these booths.

In order to illustrate more clearly the innovative principles of the present invention and its advantages compared to the prior art, an example of embodiment applying these principles will be described below with the aid of the accompanying drawings. In the drawings.

Figure 1:
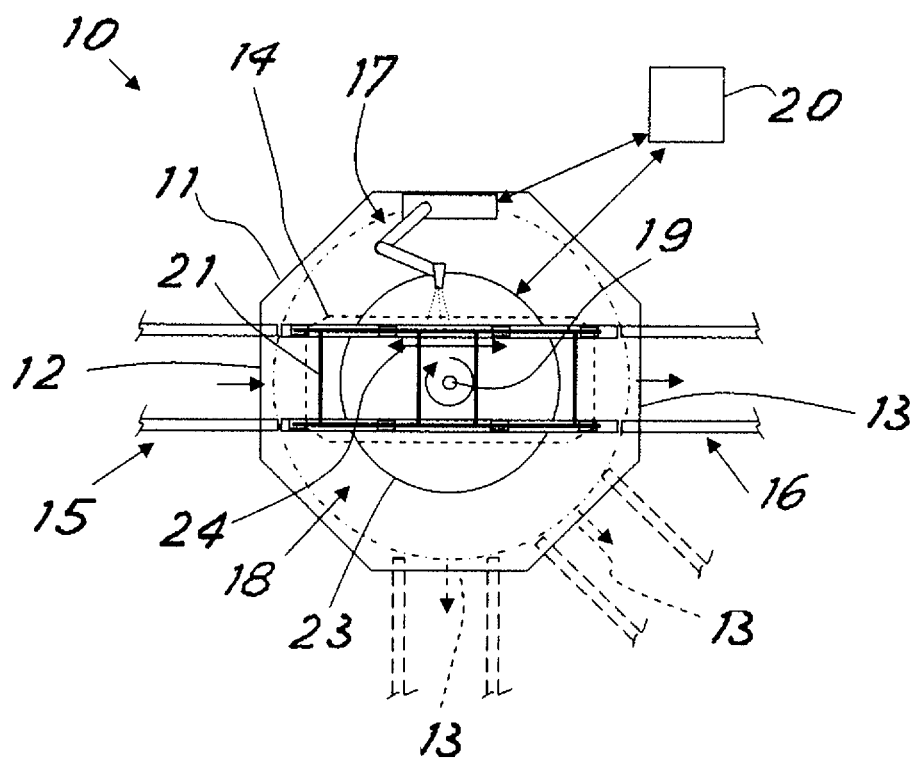
FIG. 1 shows a schematic plan view of an embodiment of a station according to the invention.

With reference to the Figures, FIG. 1 shows in schematic form a treatment station designed in accordance with the invention and indicated overall by 10.

The station 10 comprises a booth 11 provided with at least one entrance 12 and at least one exit 13 for an object 14 to be treated. The object may be advantageously a motor-vehicle body or part. Advantageously, the objects arrive at the entrance 12 by means of an entry conveyor system 15 and leave the exit 13 by means of an exit conveyor system 16. These conveyor systems 15 and 16 are of the type known per se (for example comprising motor-driven rollers, a rack, a chain, etc.) and therefore may be easily imagined by the person skilled in the art. They will therefore not be further described or shown.

The booths may also comprise systems for suction and treatment of the over-spray, of the type known per se and therefore not shown in detail.

The booth has internally at least one process or treatment robot 17 (of the type known per se) and a handling system 18 designed to receive the object from the entry conveyor system and, after treatment, to release the object to the exit conveyor system. The treatment may advantageously consist of spray-painting and in this case the robot is a painting robot.

The booth also has a platform or support 23 which is motor-driven so as to rotate the object about a vertical axis 19, advantageously in a central position of the object to be treated. Preferably, the rotation about the axis 19 allows the various sides of the object to be processed to be arranged opposite the robot 17. The platform 23 may form part of the handling system 18 such that the latter also rotates about the axis 19 so that it can be used in various angular positions, as will become clear below.

The entrances and exits of the booths may be aligned and face each other on opposite sides of the booth (as shown for example in continuous lines in FIG. 1) or may be arranged unaligned (in particular on the sides of the booth not facing each other, as shown for example in broken lines in FIG. 1 for the exits).

In the first case the handling system 18, when rotated into a position for alignment of the entrance and exit, may form a direct connection between the entry conveyor system 15 and the exit conveyor system 16, while in the second case the handling system 18 may be rotated alternately into alignment with the entry conveyor system 15 and into alignment with the exit conveyor system 16, in order to receive or discharge, respectively, an object passing through or to be treated.

Advantageously, the platform 23 also comprises means 24 which form a system for the alternate displacement, inside the booth, of the object 14 along its longitudinal path (or main axis, namely the axis of greatest extension of the object, which is usually also the axis of advancing movement of the object along the treatment plant). In this case, the system 20 for controlling the station advantageously controls in synchronism the movement of the robot and the displacement of the object such as to displace alternately the object along the longitudinal axis depending on the painting movement of the robot. The synchronous movement allows the surface area of the object which is facing the robot for painting to be increased. This for example allows a robot with a smaller lateral reach to be provided, the displacement movement of the object defining in fact an axis of horizontal relative movement between the surface to be treated and the robot applicator. Advantageously, during painting/treatment, the displacement movement may be performed transversely opposite the robot. With this function the over-spray will be concentrated in a small well-defined zone.

The system 20 may be a computerized electronic control system, which is suitably programmed, of the type known per se.

Advantageously the displacement means are formed by the same system 18 which performs the entry and exit movement.

The control system 20 may also cause rotation of the object about the vertical axis 19 in synchronism with the robot and/or the displacement movement.

The movements of the object inside the booth will also depend on the methods chosen for the application operations and/or the shape and size of the object.

For example, the rotation may be simply a complete rotation through 180° in order to position opposite the robot firstly one flank or side of the object and then the opposite flank or side. In this way, the object may be processed on one side in the first position, rotated through 180° and processed on the opposite side. The treatment is thus performed on both sides without further rotational movements, but, at the most, with only displacement movements of the object along the longitudinal axis.

Alternatively, the rotation may also be performed in steps smaller than 180° so as to arrange facing the robot various successive lateral portions of the object, with the robot which gradually treats these portions until completion of the surface to be treated.

The handling system 18 and the displacement system may have various forms depending on the movement adopted and the type of object, for example in the case of vehicle bodies/articles moved along the conveyor line.

In particular, in the case of vehicle bodies/articles positioned on conveyor skids 21, usually provided with two parallel sliding runners, two rows of motor-driven rollers 22, on which the runners of the skid entering the booth may rest, can be used. Suitable guide rails may also be provided. The same rollers may form both the handling system and the means for alternating displacement of the article inside the booth.

The entry conveyor system 15 will insert the skid with the vehicle body/article on the handling system 18 (aligned with the entrance 15) which will assume control of it until it is centred in the rotating platform. Thereafter the rotational and/or displacement movement will bring the various parts of the vehicle body/article into the operating radius of the robot until the surface treatment operations have been completed. At the end, the platform will be rotated so as to align the handling system with the exit 13 and the vehicle body/article will be unloaded by the handling system 18 onto the exit conveyor system 16 and evacuated from the station so as to continue towards successive processing stations.

As can be clearly seen in the figures, although the booth may have various shapes (including a rectangular shape or also a circular shape in plan view, which may optimize its internal volume) in order to optimize the internal space of the booth and its functionality it has been found to be advantageous to design the booth with a polygonal, preferably rectangular shape, having more than four sides.

Figure 3:
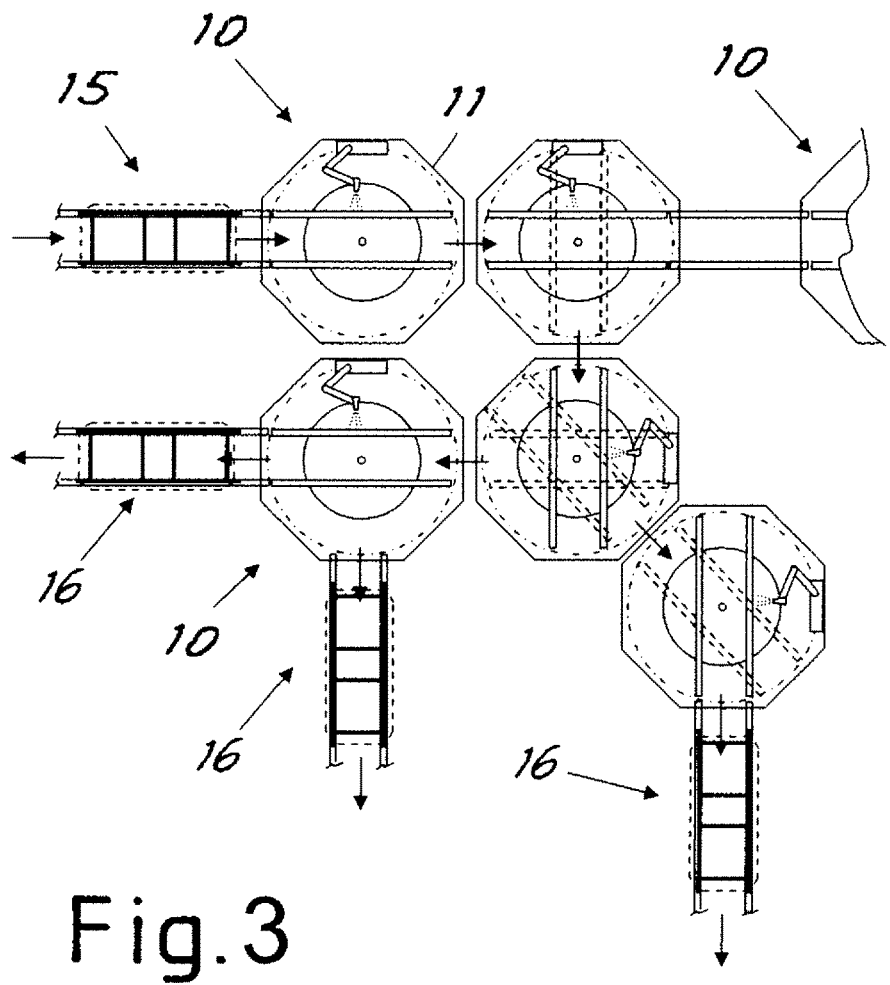
FIG. 3 shows a schematic plan view of a plant according to the invention.
Figure 4:
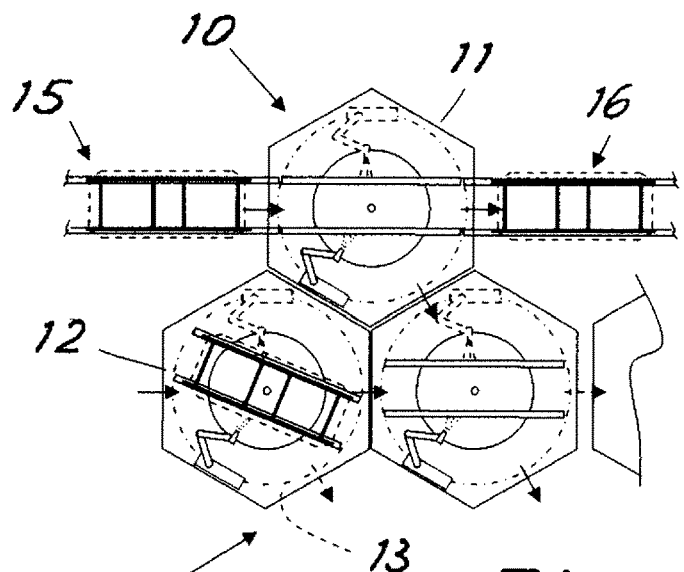
FIG. 4 shows a schematic plan view of an alternative embodiment of a station according to the invention and a plant provided with a plurality of these stations.

In particular, an octagonal shape (as shown in FIGS. 1 and 3) or hexagonal shape (as shown in FIG. 4) has been found to be especially advantageous.

The booth may advantageously have at least one entrance and one exit on respective sides of the polygon and a robot arm on the other side of the polygon.

Alternatively, as for example shown in FIG. 4, the robot may be arranged in a corner (or the booth may have another transverse side instead of the corresponding corner of the regular form).

The hexagonal or octagonal plan-view shape is preferable mainly because it allows the size thereof to be suitably chosen (for example so as to inscribe the circumference defined by rotation of the object by means of the internal handling system) and at the same time allows optimization of the station volume, with the possibility of obtaining substantially flat internal walls which can be more easily manufactured and used.

The reduction in the internal volume compared, for example, to a rectangular shape results in smaller amounts of air needed for elimination of the overspray.

Figure 2:
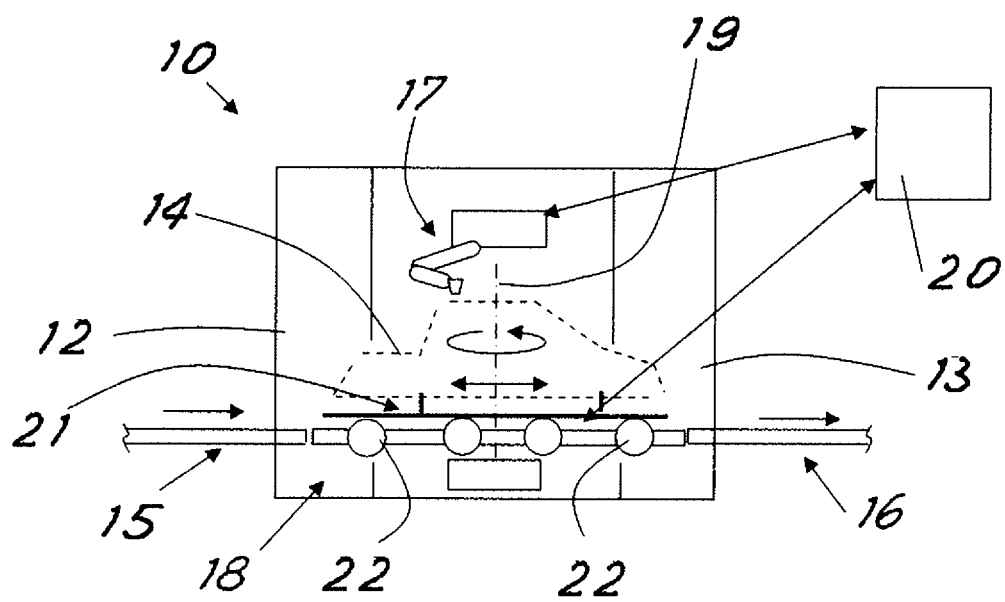
FIG. 2 shows a schematic side elevation view of a station according to the invention.

As schematically shown in FIG. 2, the robot arm may be advantageously arranged so that at least in a rest position it is situated at a greater height than the object on the handling system, such as to allow rotation of the object with minimum play relative to the side walls of the booth, avoiding at the same time interference with the robot. This is particularly useful in the case of long objects, such as motor-vehicle bodies.

Moreover, as can be clearly seen from the figures, as a result of the polygonal shape with more than four sides, it is possible to obtain, as required, flat entrance and exit walls in the booth which are arranged facing each other on opposite sides, at right angles or at an angle in between the two.

FIGS. 3 and 4 show examples of treatment plants provided with a plurality of stations according to the invention. FIG. 3 shows five stations 10 in a checkerboard configuration, with each booth 11 of stations 10 having in plan view an octagonal shape. Four of the stations 10 are arranged in checkerboard configuration along ranks and files of the checkerboard. Those four stations 10 may be designated, for example, as a first station 10 (upper left), a second station 10 (upper right), a third station 10 (lower right), and a fourth station 10 flower left). As can be seen by the arrows in FIG. 3, the plant can be configured to pass the motor-vehicle body and/or motor-vehicle component from the first station 10 to the second station 10, and then from the second station 10 to the third station 10. As also can be seen by the arrows in FIG. 3, the plant can be configured to pass the motor-vehicle body and/or motor-vehicle component from the second station 10 to the third station 10, and then from the third station 10 to the fourth station 10. Additionally, also can be seen by the arrows in FIG. 3, the plant can be configured to pass the motor-vehicle body and/or motor-vehicle component from the second station 10 to the third station 10, and then from the third station 10 to the fifth station 10 in the direction of a diagonal of the checkerboard.

As can be seen from the figures, the space occupied by the plant may be better used owing to the presence of the platform for rotating the bodies/articles and the possibility of having entrances and exits at various angles around the booth. It is in fact possible to provide a plant in which at least some of the stations of the plurality are arranged alongside each other in the two directions so as to obtain a plant where the occupied space is made better use of. Advantageously, at least some of the stations of the plurality may have at least one entrance and at least one exit arranged at angles with respect to each other.

In this way it is possible to define more easily within the plant a path which passes through the stations and which is not straight.

In particular, by using an octagonal or hexagonal shape it is possible to obtain easier arrangement, next to each other or facing each other, of the exit of one booth with the entrance of the next booth depending on the choice of various useful configurations. As can be seen in FIGS. 3 and 4, the configurations may for example be advantageously described as being of the "checkerboard" or "honeycomb" type.

Moreover, it is also possible to provide multiple entrances and/or exits in a same booth so as to obtain several alternative paths along the plant, for example so as to differentiate between the treatments, depending on the incoming part to be treated. It is also possible to provide multiple entrances into and/or exits from the plant, for example again with conveyor systems 15 and 16.

The entry conveyor system 15 and the exit conveyor system 16 between two booths may be easily the two ends of a same, albeit very short, conveyor system or may also be formed by the handling system of the preceding or following booth arranged alongside or at a short distance, as may be easily imagined with the reference to the same FIGS. 3 and 4.

With the hexagonal booths it is possible in various cases to obtain a better use of the space in the plant (for example with the "honeycomb" arrangement which can be seen in FIG. 4), albeit with a slight increase in the internal volume, than with the octagonal booths (more easily arranged in "checkerboard" fashion). The connection between one booth and another may also be performed by means of a connection tunnel which may also have the function of providing a further manoeuvring space for optimum positioning of the article to be treated.

As can be seen for example in FIG. 4, the robot may be arranged on a wall of the booth or in a corner between two walls, or in both locations.

Advantageously, the platform will rotate the object so as to position it preferably with its main axis arranged transversely facing the robot, as for example shown in FIG. 4 for the booth situated at the bottom on the left, such that the entire side of the object faces the robot. Once the first side has been processed, the object may be rotated through 180° so that its opposite side is arranged facing the robot.

Obviously, the arrangement shown in FIG. 3 is provided merely by way of example and a plant according to the invention may have different arrangements depending on the specific needs. Moreover, the painting stations may have, arranged between them at intervals, stations for performing other known treatments such as: cleaning, sanding, sealing, soundproofing, quality control, etc., in addition to the known ones, such as drying ovens or the like. Within the plant, the stations according to the invention may also be easily arranged at intervals with painting stations, or the like, which may also have a different shape, for example a rectangular or square shape, and the octagonal stations may be combined with hexagonal stations, depending on the requirements.

As is now obvious to the person skilled in the art, the stations may also be arranged at a distance from each other, while also maintaining the more or less regular "checkerboard" or "honeycomb" arrangements shown in FIGS. 3 and 4, for example so as to define walkways between them useful for the transit of maintenance personnel or as a passageway for other service systems.

At this point it is clear how the predefined objects have been achieved.

Obviously the description above of an embodiment applying the innovative principles of the present invention is provided by way of example of these innovative principles and must therefore not be regarded as limiting the scope of the rights claimed herein. For example, for specific needs, it is nevertheless possible to envisage providing several robot arms in a same booth according to the invention. Moreover, the term "painting" must be understood in the broad sense, namely that the fluid sprayed by the robot arm must not be necessarily a paint, but may also be another surface treatment fluid or a fluid for performing operations envisaged in application processes carried out on articles which are produced and treated in particular in the automotive sector. As mentioned, the system for moving the object, and in particular the vehicle body, between entrance and exit of the booth may also be separate from the alternate handling means inside the booth, although a single construction on the rotating support platform is preferable. The number of stations in a plant may obviously vary and may also comprise only two stations arranged for example so as to have an entry direction into the plant and an exit direction from the plant, arranged at an angle with respect to each other.

The invention claimed is:

1. A plant for treating motor-vehicle bodies and/or motor-vehicle components, the plant comprising:
   first, second, third, and fourth stations;
   wherein each of the stations comprises:
      a booth comprising at least one entrance for a motor-vehicle body and/or motor-vehicle component and at least one exit for the motor-vehicle body and/or motor-vehicle component;
      a system configured to move the motor-vehicle body and/or motor-vehicle component between the at least one entrance and the at least one exit;
      at least one robot configured to treat the motor-vehicle body and/or motor-vehicle component in the booth; and
      a platform inside the booth configured to support the motor-vehicle body and/or motor-vehicle component;
   wherein the platform is configured to rotate about a vertical axis so as to rotate the motor-vehicle body and/or motor-vehicle component inside the booth relative to the at least one robot, and
   wherein the system configured to move the motor-vehicle body and/or motor-vehicle component is configured to rotate with the platform so as to align with the at least one entrance in order to receive the motor-vehicle body and/or motor-vehicle component, and so as to align with the at least one exit in order to release the motor-vehicle body and/or motor-vehicle component,
   wherein the stations are arranged in checkerboard configuration along rows and columns of the checkerboard,
   wherein for at least one of the stations, the at least one entrance is not aligned with the at least one exit,
   wherein for each of the stations, the booth has in plan view an octagonal shape, and
   wherein the at least one robot is configured to treat the motor-vehicle body and/or motor-vehicle component by spraying fluid toward the motor-vehicle body and/or motor-vehicle component.

2. The plant of claim 1, wherein the plant is configured to pass the motor-vehicle body and/or motor-vehicle component from the first station to the second station, and then from the second station to the third station, and
   wherein for the first station, the at least one entrance is not aligned with the at least one exit.

3. The plant of claim 1, wherein the plant is configured to pass the motor-vehicle body and/or motor-vehicle component from the first station to the second station, and then from the second station to the third station, and
   wherein for the second station, the at least one entrance is not aligned with the at least one exit.

4. The plant of claim 1, wherein the plant is configured to pass the motor-vehicle body and/or motor-vehicle component from the first station to the second station, and then from the second station to the third station, and
   wherein for the third station, the at least one entrance is not aligned with the at least one exit.

5. The plant of claim 1, wherein the octagonal shape is a regular octagon.

6. The plant of claim 1, wherein the fluid comprises paint.

7. The plant of claim 1, wherein the fluid comprises fluid other than paint.

8. A plant for treating motor-vehicle bodies and/or motor-vehicle components, the plant comprising:
   first, second, and third stations;
   wherein each of the stations comprises:
      a booth comprising at least one entrance for a motor-vehicle body and/or motor-vehicle component and at least one exit for the motor-vehicle body and/or motor-vehicle component;
      a system configured to move the motor-vehicle body and/or motor-vehicle component between the at least one entrance and the at least one exit;
      at least one robot configured to treat the motor-vehicle body and/or motor-vehicle component in the booth; and
      a platform inside the booth configured to support the motor-vehicle body and/or motor-vehicle component;
   wherein the platform is configured to rotate about a vertical axis so as to rotate the motor-vehicle body and/or motor-vehicle component inside the booth relative to the at least one robot, and
   wherein the system configured to move the motor-vehicle body and/or motor-vehicle component is configured to rotate with the platform so as to align with the at least one entrance in order to receive the motor-vehicle body and/or motor-vehicle component, and so as to align with the at least one exit in order to release the motor-vehicle body and/or motor-vehicle component,
   wherein the stations are arranged in honeycomb configuration,
   wherein for at least one of the stations, the at least one entrance is not aligned with the at least one exit,
   wherein for each of the stations, the booth has in plan view an octagonal shape, and
   wherein the at least one robot is configured to treat the motor-vehicle body and/or motor-vehicle component by spraying fluid toward the motor-vehicle body and/or motor-vehicle component.

9. The plant of claim 8, wherein the plant is configured to pass the motor-vehicle body and/or motor-vehicle component from the first station to the second station, and then from the second station to the third station, and
   wherein for the first station, the at least one entrance is not aligned with the at least one exit.

10. The plant of claim 8, wherein the plant is configured to pass the motor-vehicle body and/or motor-vehicle component from the first station to the second station, and then from the second station to the third station, and
    wherein for the second station, the at least one entrance is not aligned with the at least one exit.

11. The plant of claim 8, wherein the plant is configured to pass the motor-vehicle body and/or motor-vehicle component from the first station to the second station, and then from the second station to the third station, and
    wherein for the third station, the at least one entrance is not aligned with the at least one exit.

12. The plant of claim 8, wherein the octagonal shape is a regular octagon.

13. The plant of claim 8, further comprising:
    a fourth station.

14. The plant of claim 8, wherein the fluid comprises paint.

15. The plant of claim 8, wherein the fluid comprises fluid other than paint.

16. A plant for treating motor-vehicle bodies and/or motor-vehicle components, the plant comprising:
- first, second, and third stations;
- wherein each of the stations comprises:
  - a booth comprising at least one entrance for a motor-vehicle body and/or motor-vehicle component and at least one exit for the motor-vehicle body and/or motor-vehicle component;
  - a system configured to move the motor-vehicle body and/or motor-vehicle component between the at least one entrance and the at least one exit;
  - at least one robot configured to treat the motor-vehicle body and/or motor-vehicle component in the booth; and
  - a platform inside the booth configured to support the motor-vehicle body and/or motor-vehicle component;
- wherein the platform is configured to rotate about a vertical axis so as to rotate the motor-vehicle body and/or motor-vehicle component inside the booth relative to the at least one robot, and
- wherein the system configured to move the motor-vehicle body and/or motor-vehicle component is configured to rotate with the platform so as to align with the at least one entrance in order to receive the motor-vehicle body and/or motor-vehicle component, and so as to align with the at least one exit in order to release the motor-vehicle body and/or motor-vehicle component,
- wherein the stations are arranged in checkerboard configuration along a diagonal of the checkerboard,
- wherein for at least one of the stations, the at least one entrance is not aligned with the at least one exit,
- wherein for each of the stations, the booth has in plan view an octagonal shape, and
- wherein the at least one robot is configured to treat the motor-vehicle body and/or motor-vehicle component by spraying fluid toward the motor-vehicle body and/or motor-vehicle component.

17. The plant of claim 16, further comprising:
a fourth station.

18. The plant of claim 16, wherein the fluid comprises paint.

19. The plant of claim 16, wherein the fluid comprises fluid other than paint.

20. The plant of claim 16, wherein the octagonal shape is a regular octagon.

* * * * *